United States Patent [19]

Lamberet et al.

[11] Patent Number: 4,744,185
[45] Date of Patent: May 17, 1988

[54] EDGE PROFILE FOR INSULATING PANEL

[75] Inventors: Philippe Lamberet, Onjard, Bage La Ville, Ain; Georges Robin, Mezeriat, both of France

[73] Assignee: Philippe Lamberet, Bage La Ville, France

[21] Appl. No.: 820,934

[22] Filed: Jan. 21, 1986

[30] Foreign Application Priority Data

Jan. 22, 1985 [FR] France ................. 85 01243

[51] Int. Cl.[4] ................. E04C 1/30; E04C 2/00
[52] U.S. Cl. ................. 52/309.11; 52/403; 52/580; 52/586; 52/588; 52/594
[58] Field of Search ................. 52/394, 478, 579, 588, 52/593, 586, 309.11, 580, 403, 594

[56] References Cited

U.S. PATENT DOCUMENTS

| 3,365,851 | 1/1968 | Cushman | 52/580 |
| 3,367,076 | 2/1968 | O'Brien | 52/394 |
| 3,487,756 | 1/1970 | Glaza | 52/579 |
| 4,236,366 | 12/1980 | Rijnders | 52/580 |
| 4,360,533 | 11/1982 | Landheer | 52/594 X |

FOREIGN PATENT DOCUMENTS

| 47557 | 4/1974 | Australia | 52/586 |
| 310745 | 1/1956 | Switzerland | 52/588 |
| 2065744 | 11/1979 | United Kingdom | 52/588 |

Primary Examiner—Alfred C. Perham
Assistant Examiner—Richard E. Chilcot, Jr.
Attorney, Agent, or Firm—Karl F. Ross; Herbert Dubno

[57] ABSTRACT

Thermally insulating panels are formed at opposite sides with finishing edge strips about which sheet metal facings of the panels engage, the strips having ribs and grooves to allow mortise and tenon interconnection of the panels. A fold between a groove and a rib of the respective panel receives a metal insert which provides structural support and interengaging flanges of the insert, which preferably is composed of high density PVC, can interlock for effective sealing.

4 Claims, 1 Drawing Sheet

EDGE PROFILE FOR INSULATING PANEL

FIELD OF THE INVENTION

My present invention relates to an edge profile for an insulating panel, specifically an insulating panel adapted to be interlocked with identical panels to form an insulated enclosure, and to the panels having the improved edge profile, e.g. for use in cold chambers, for example, refrigerated compartments and the like.

BACKGROUND OF THE INVENTION

Insulated panels which are intended to define spaces maintained at a low temperature, such as refrigerated compartments, generally comprise a pair of metal sheets or faces, i.e. metal linings, on a core of thermal insulation and can be fabricated by injection between the metal linings which are disposed along two broad faces of a mold, of a foam of synthetic resin or plastic material such as a polyurethane, adapted to form an isothermal or insulating core.

To permit the interfitting of such panels, edge-to-edge in a reciprocal manner, the edges of the panels are generally molded with a transverse cross section of substantially S shape defining a groove adjusting the rib of which is adapted to be interfitted or interlocked with an identical but inversely disposed profile on the opposite edge of the adjoining otherwise identical profile by mortise-and-tenon connection. In other words, the rib of one edge profile engages in the groove of the other edge profile as a tenon in a mortise, while the groove of the first edge profile receives the rib of the other edge profile as a mortise receives a tenon.

In the past, these edge profiles have been defined by strips which form the rib and groove, respectively, disposed between the metal liners before injection between them of the core of foamed synthetic resin material.

These strips, moreover, must be joined and plastered to minimize gaps between them, may have to be tapped or otherwise modified so that, during the injection of the foam, flashing will not escape between crevices between strips or otherwise.

For this purpose adhesive strips are used.

In practice, however, it has been found that all of these approaches are insufficient in that there is nevertheless some leakage and thus development of burrs or wastes which project from junctions of the strips and interfere with effective interlocking of the edges or require special removal techniques, or make it necessary to cement the junction between panels, all of which not only increases the cost, but reduces the versatility of the panel connection and creates problems with respect to the finish of the edges of the panels.

Furthermore, with the conventional edge formations, it has been found to be necessary to allow mounting of elements which are to carry units to be supported from the walls or from the ceiling by cementing them in iplace between the metal facing sheets or lining before injection of the plastic foam. This involves additional manipulative steps and creates the possibility of further defects in the product.

OBJECTS OF THE INVENTION

It is the principal object of the present invention to provide an improved edge profile for a thermally insulating panel which avoids the aforedescribed drawbacks.

Another object of the invention is to provide a thermally insulating panel which does not reqire special finishing steps for the production of a high quality interlocking edge, can be readily interlocked with identical panels in a reciprocal relationship without the need for mastics or the like to seal the junction, and which not only provides improved insulation but also simplifies assembly and fabrication, and reduces the cost of fabrication and assembly.

SUMMARY OF THE INVENTION

These objects and others which will become apparent hereinafter are attained, in accordance with the invention by providing along each edge of a panel as described, a generally S-shaped profile member which defines the entire edge of the panel, is anchored in the injected plastic foam and has on its outwardly facing side (i.e. facing the adjoining panel), a groove and a rib formed side-by-side and playing the role of mortise and tenon, respectively, for interlocking with an inversely turned, but identical edge strip of the adjoining panel. Between the groove and rib an inwardly extending fold is provided, which reaches into the core of the foamed material, and defines a flat generally rectangular channel open toward the exterior and receiving a metal insert constituted by a bar of corresponding cross section, i.e. generally rectangular flattened section so that the opening of this rectangular compartment is closed by the adjoining panel.

The two profiled members of opposite edges of the panel are disposed in inverse relationship to one another so that a first end of one panel can interlock with the second end of the second panel and vice versa.

Since a flat edge profile member defines each connecting edge of a panel, the edges of the panels are perfectly finished so that there is no danger that burrs or flashing will be formed during injection of the foamed plastic. The edge members also considerably simplify fabrication of the panels because they define the lateral faces of the mold cavity in which the foam is injected, replacing the strips and thus eliminating all need for plastering, application of antisticking compositions and adhesive strips, but also significantly reducing the number of gaps or junctions between the metal sheets defining the broad surfaces of the panels because the profile members can interfit with bent edge portions or flanges of these metal sheets before injection of the plastic foam into the interior of the panel. In addition, because the sheets and profiled members can be interfitted before the assembly is introduced into the mold, the manufacturing operations are reduced, the cost of manufacture is limited and there is little need for meticulous positioning of parts prior to injection of the foam.

To improve the anchorage of the profile member to the panel during the injection of the foamed synthetic resin, the fold is provided at its bottom with a pair of oppositely extending, divergent ribs in the form of flanges which project into the foamed material and around which the foamed material is hardened, these flanges forming barbs anchoring the profile member in the foamed material.

According to another feature of the invention, the edges of the sheet metal facings for the panel are turned inwardly and engage around forms of the profiled member so that they are gripped by the profile member.

More specifically, the sheet metal facing on one side of the panel can have its edge bent at 90° inwardly to engage in an outwardly open fold formed laterally along the corresponding side of the panel by the profile section. The edge of the other sheet metal facing can be bent around a flange of the profile member on the opposite side of the panel through 180°.

One side of the lateral fold can be of a greater height than the other side of the lateral fold so that the edge of the facing of an adjoining panel which has been bent through 180° about a flange of its profile member can lie flush with the side of the first mentioned panel at which the sheet metal facing is bent at a right angle to engage in the fold.

The shorter side of the lateral fold cn be provided with a deflectable web formed at its outer edge with a tubular bead compressed between the right angle bend of one sheet metal facing of one panel and the edge of the flange around which the sheet metal facing of the adjoining panel is bent through 180°. The thickness of this flange plus twice the thickness of the sheet metal facing can be equal to the difference in heights of the walls of the lateral fold.

According to another feature of the invention, the flange is provided with one or more deflectable lips which engage as barbs an array of teeth formed on a juxtaposed shank of the rib of the profile member with which the first-mentioned panel is engaged to define an interlocking set of forms therewith.

For effective sealing against incursion of heat or escape of cold, the profile member can be formed at the base of its groove with a deflectable flange or lip which is of comparatively reduced thickness and normally projects out of a recess into which this lip can be deflected with two edges of panels are interlocked or joined, the lip being pressed into the recess by an end face of the rib of the other panel.

Advantageously, the profile members are extruded unitarily from a plastic material which is comparatively rigid, i.e. high density polyvinyl chloride.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
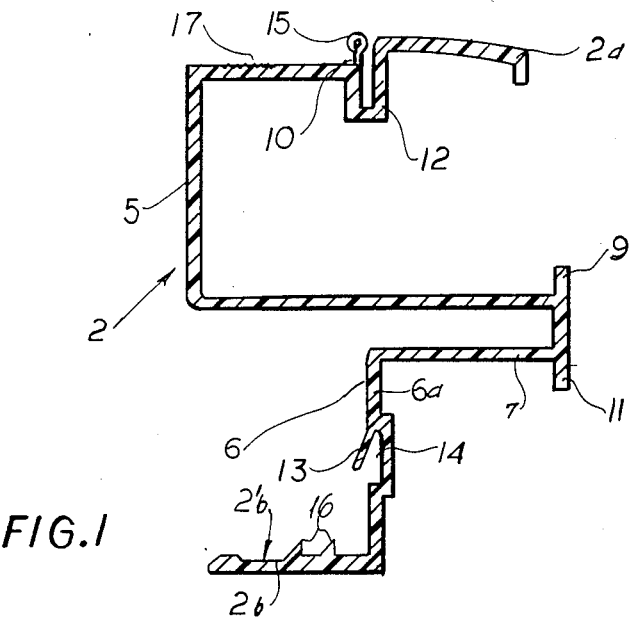
FIG. 1 is a transverse section through an extruded profile member according to the invention.

As can be seen from FIG. 1, the profile member of the present invention defines a lateral edge of an insulating panel of the type which comprises a pair of sheet metal facing layers between which a core of synthetic resin foam can be formed by injection, the profile section being illustrated at 2 in FIG. 1, being anchored in the core of the panel, and being sealingly engaged by the metal facings so that there are no gaps through which the foamed material can extrude. As a consequence, the profile member 2 completely finishes the edge of the panel without requiring the special precautions necessary in prior art insulating panels.

Figure 2:
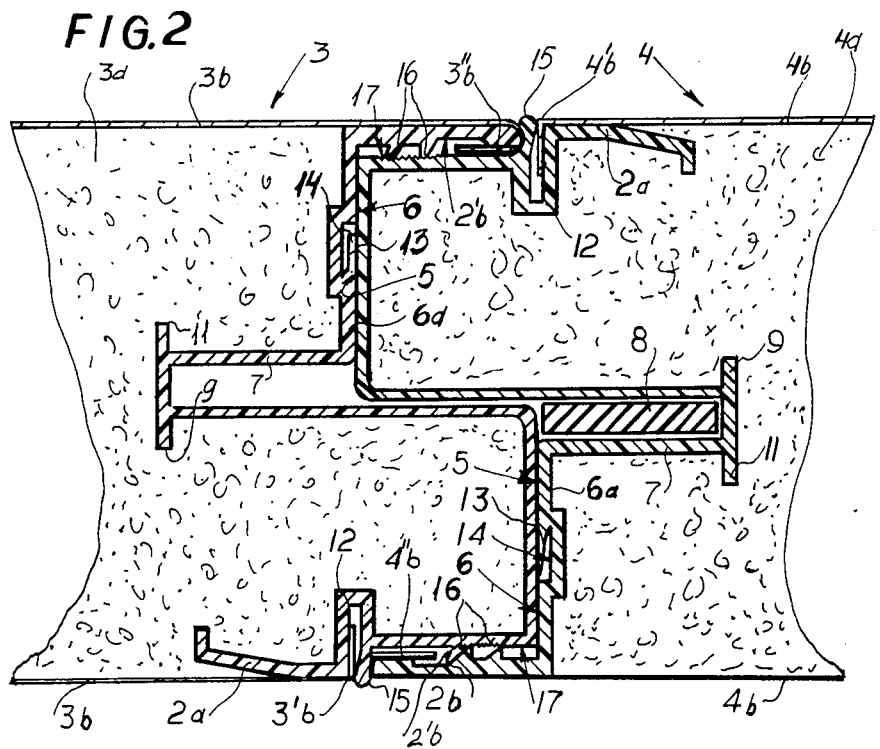
FIG. 2 is a horizontal transverse section through the junction between two insulating panels disposed edge-to-edge, in accordance with the invention.

The profile member 2 can be provided along each of the edges to be joined of the other thermal or thermally insulating panels 3 and 4 and it will be apparent that when the profile member 2 is rotated through 180° about a longitudinal axis, it can interfit with another profile member as has been shown in FIG. 2 in accordance with tenon and mortise principles.

The edges of each of the panels 3 and 4 seen in FIG. 2, therefore, is provided with one of the profile members 2 and each of these profile members is generally of S section and forms along its external side or face, i.e. the face turned toward the other panel, with a rib 5 and a groove 6 adapted to form a mortise and tenon, respectively with reference to the groove 6 and the rib 5 of the identical but inversely positioned profile member on the corresponding edge of the adjacent panel 4 or 3. The generally S shape of the profile members 2 thus permits a reciprocal interlocking of the two contiguous panels 3 and 4.

Between the rib 5 and the groove 6, each profile member 2 is formed with an inwardly extending fold 7 of flattened transverse rectangular section, open toward the exterior and adapted to receive a metal insert 8 constituted by a flat plate which can extend the full length of the edge of the panel and can be provided so that various units not illustrated in the drawing can be attached. The load-bearing member 8 can thus support units on the wall or from the ceiling of the cold chamber defined by the interlocked panels.

As has been shown in the drawing, the bottom of the fold 7 is bounded exterially by two oppositely directed ribs or flanges 9 and 11 which constitute hooks or barbs embedded in the cores 3a and 4a of injected foamed plastic material, such as polyurethane, filling the interior space of the panel between the metal sheets 3b, 4b defining the faces of the panels and the edge strips 2.

The fold 7 and the flanges 9 and 11, therefore, are anchored in the foamed plastic in which they are embedded.

As has also been shown in the drawing, an outer wing 2a of the profile member 2 adjacent the rib 5 is provided with a laterally open but inwardly extending fold 12 which is also of rectangular cross section and comparatively flattened.

The fold 12 is designed to receive a right angle bend 3'b or 4'b of the respective metal sheet 3b, 4b, along the same side of the panel as is provided with the rib. This interengagement of the metal sheet and the respective profile member assures not only perfect positioning of the metal facing 3b or 4b and good enchorage thereof, but also a particularly pleasing appearance for the assembly.

The flange 2b, however, defining the respective groove is provided along its free internal face, with a groove or recess 2'b enabling the folding through 180° of the adjacent edge 3''b or 4''b of the respective metal facing 3b, 4b.

As can be seen from FIG. 2, the two edge profile members 2 located along opposite edges of the same panel are inverted with respect to one another so that two identical panels can be assembled with one another as has been shown for the panels 3 and 4 so that the respective grooves 6 and ribs 5 interengage with one another inversely with reciprocal imbrecation.

The fabrication of the insulating panels formed with the edge profile members 2 is considerably simplified with respect to the fabrication of earlier panels because the profile members 2 constitute the lateral faces of the mold into which the foamed plastic is injected to form the core 3a, 3b and thereby anchor the profile members 2 and the panels in place.

By engagement of the folded edges of the facing sheets in the fold 12 and around the flange 2b of each profile member 2, the facing sheets 3b and 4b can be held taut along the opposite sides of the panel with a minimum number of gaps so that filling with the foam is facilitated.

The engagement of the edges 3'b, 4'b and 3"b, 4"b of the facings in the profile member 2 ensures accurate positioning of all of the parts with respect to one another so that escape of the foamed material is precluded even without the need for adhesive tapes or the like. As a consequence, once the core material is injected, a finished panel is obtained with a finished edge free from flashing.

The profile members are preferably constituted, as noted, from a relatively rigid material such as high density polyvinyl chloride (PVC) which provides a panel edge which is highly stable and can withstand forces applied during interfitting. The fact that these members form a finished edge eliminates many of the operation hitherto found to be necessary in conjunction with insulating panels.

In order to improve still further the sealing between panels, as can be seen in greater detail from FIG. 1, the base of the groove 6 is provided with a flexible lip 13 fixed by one of its edges on the bottom wall 6a of the groove 6, adjacent a recess 14 and so that it is slightly inclined outwardly toward the exterior, i.e. toward the adjoining edge of the other panel, before the two are forced together. Preferably, before the edges of the panels are assembled, the lip 13 defines an angle of about 15° to 20° with the bottom wall 6a of the groove 6.

The lip 13 is formed by extrusion with the remainder of the profile member 2 and its flexibility and elasticity are ensured because of its reduced thickness.

Upon assembly of the edges of the panels as can be seen from FIG. 2, the lip is deflected into the respective recess 14 and thus bears resiliently against the opposite panel edge to maintain sealing of the assembly at all times.

As is also visible from FIG. 2, the wall 12a of the lateral fold 12 is significantly longer or higher than the wall 12b or, stated otherwise, the wall 12b of the fold 12 adjacent the rib 5 is much shorter than the other wall 12a of this fold.

The difference in heights of these walls is substantially twice the thickness of the sheet metal facing 3b or 4b plus the thickness of the flange 2b. This ensures a flush assembly of the panels when the flange 2b overlies the wall 5a of the rib 5.

With this construction, therefore, the sheet metal facings of the two panels on each side thereof are located in the same plane.

In order to fill any remaining separation between the facings of the two panels and thus improve the esthetics of the assembly, the flange 2a of each profile section 2 is formed along the edge of the fold 12 adjacent the rib 5, i.e. along the shorter wall 12b of this fold, with a web 10 extending toward the exterior and formed along its free edge with a tubular bead 15 of reduced wall thickness so that it is compressible between the juxtaposed folded edges of the facings 3b and 4b.

The bead 15 completely fills any gap between the sheet metal facings 3b and 4b and thus eliminates the need to calk the gap with a mastic or other finishing material.

To improve the interlocking between the mortise and tenon portions of two interconnected panels, the flange 2b bounding the groove 6 is provided on its internal face between the recess 4"b and the floor 6a of the groove 6 with two lips 16 oriented or turned toward the base 6a in order to form barbs or hooks which resiliently engage an array of teeth 17 formed on the flange 2a bounding the rib 5 of the other profile member received in this groove and formed in the region of the free end of this rib. Because each profile member is formed with such lips and teeth, the reciprocally engaging profile members of the two panels thus are coupled firmly against separation when one profile member is driven into the other.

We claim:

1. A profile member adapted to form an edge of an insulating panel for coupling with an identical but inversely positioned coupling member of an adjoining insulating panel, said profile member being generally of S transverse cross section and being formed unitarily with:
    a rib lying parallel to a groove so that said rib is engageable in the groove of the other profile member and the groove receives a rib of the other profile member, and a fold of flattened rectangular cross section adapted to extend inwardly with respect to a panel formed with the profile member and opening toward the other profile member for receiving a flat rectangular-section metal insert so that said fold is closed when the profile member is interfitted with the other profile member, said fold being formed at a base thereof with a pair of oppositely projecting flanges engageable in a body of foam material adapted to be molded around said fold, said rib being bounded on a lateral side of said profile member with a flange formed with a laterally outwardly open fold adapted to receive a right angle bent edge of a sheet metal facing of a panel formed with the profile member, said groove being bounded by a lateral flange cooperating witht he lateral flange of the other profile member bounding the rib thereof to form a groove into which an edge of a sheet metal facing bent around the lateral flange bounding the groove through 180° can extend, the lateral flange bounding said groove being formed with at least one lip projecting toward a base of said groove and engageable with an array of teeth formed on a lateral flange of the other profile member bounding the rib thereof to enable interlocking of said profile members.

2. The profile member defined in claim 1 wherein said laterally open fold has a wall proximal to a free end of said rib which is shorter than an opposite wall of said laterally open fold by a distance substantially equal to twice the thickness of a metal bent around the lateral flange bounding said groove plus the thickness of said lateral flange bounding said groove and the shorter wall is formed with a web projecting outwardly therefrom and having a tubular bead along an edge of said web for sealing sheet metal facings of the panels interconnected by said profile members.

3. An insulating panel comprising:
    a pair of spaced apart metal sheets defining broad surfaces of said panel;
    a core of foamed synthetic resin material filling space between said sheets; and
    a pair of inversely oriented but identical edge profile members at opposite edges of the panel anchored in said core and engaging corresponding edges of said metal sheets to finish the edges of said core, each of said profile members being generally of S transverse cross section for receiving an inversely positioned but identical profile member of an adjoining panel in a mortise and tenon connection, each profile member comprising:

a rib lying parallel to a groove so that said rib is engageable in the groove of the other profile member and the groove receives a rib of the other profile member, and a fold of flattened rectangular cross section adapted to extend inwardly with respect to a panel formed with the profile member and opening toward the other profile member for receiving a flat rectangular-section metal insert so that said fold is closed when the profile member is interfitted with the other profile member, each of said profile members of the panel being formed with a lateral flange bounding the respective rib on an external side thereof and provided with a laterally open flattened rectangular-section fold receiving an edge of a respective metal sheet bent at a right angle into the laterally open fold, each of said profile members being formed on the opposite lateral side thereof with a flange bounding the respective groove and about which the respective metal sheet has an edge bent through 180° around the flange bounding the groove, the laterally open fold of each of said profile members having a short wall proximal to a free end of the respective rib while an opposite wall of the laterally open fold is higher by a distance equal to twice the thickness of said metal sheet plus the thickness of the lateral flange bounding the groove whereby metal sheets of adjoining panels are substantially coplanar, the shorter wall of each laterally open groove being formed with a web projecting outwardly and having a tubular bead compressible between metal sheets of adjoining panels to finish junctions between them.

4. An insulating panel comprising:

a pair of spaced apart metal sheets defining borad surfaces of said panel;

a core of foamed synthetic resin material filling space between said sheets; and a pair of inversely oriented but identical edge profile members at opposite edges of the panel anchored in said core and engaging corresponding edges of said metal sheets to finish the edges of said core, each of said profile members being generally of S transverse cross section for receiving an inversely positioned but identical profile member of an adjoining panel in a mortise and tenon connection, each profile member comprising:

a rib lying parallel to a groove so that said rib is engageable in the groove of the other profile member and the groove receives a rib of the other profile member, and a fold of flattened rectangular cross section adapted to extend inwardly with respect to a panel formed with the profile member and opening toward the other profile member for receiving a flat rectangular-section metal insert so that said fold is closed when the profile member is interfitted with the other profile member, the rib of each profile member having a lateral flank formed with an array of teeth and a flange laterally bounding the groove of each profile member has a pair of inwardly directed lips forming barbs engageable with the teeth of an identical profile member receivable in the respective groove.

* * * * *